United States Patent
Sugano et al.

(10) Patent No.: US 7,574,104 B2
(45) Date of Patent: Aug. 11, 2009

(54) MOVING IMAGE REPRODUCTION APPARATUS AND METHOD

(75) Inventors: Yoshio Sugano, Saitama (JP); Tsuneo Sato, Saitama (JP)

(73) Assignee: Fujifilm Corporation, Tokyo (JP)

( * ) Notice: Subject to any disclaimer, the term of this patent is extended or adjusted under 35 U.S.C. 154(b) by 863 days.

(21) Appl. No.: 10/685,423

(22) Filed: Oct. 16, 2003

(65) Prior Publication Data

US 2004/0081429 A1    Apr. 29, 2004

(30) Foreign Application Priority Data

Oct. 18, 2002  (JP)  ............... 2002-304755
Nov. 15, 2002  (JP)  ............... 2002-332418

(51) Int. Cl.
*H04N 5/91* (2006.01)
(52) U.S. Cl. ............ 386/69; 348/333.11; 348/333.12; 348/333.01
(58) Field of Classification Search ............ 386/1, 386/45, 69–70, 125–126; 348/333.01, 333.11, 348/333.12
See application file for complete search history.

(56) References Cited

U.S. PATENT DOCUMENTS

| | | | |
|---|---|---|---|
| 5,818,439 A * | 10/1998 | Nagasaka et al. | 725/87 |
| 6,268,854 B1 * | 7/2001 | Borden et al. | 715/786 |
| 6,700,612 B1 * | 3/2004 | Anderson et al. | 348/333.11 |
| 6,925,602 B1 * | 8/2005 | Clapper | 715/723 |
| 7,016,596 B2 * | 3/2006 | Itoh | 386/46 |
| 2001/0053277 A1 * | 12/2001 | Jun et al. | 386/70 |
| 2003/0026594 A1 * | 2/2003 | Shiiyama | 386/69 |
| 2003/0049022 A1 * | 3/2003 | Lee | 386/126 |
| 2004/0128317 A1 * | 7/2004 | Sull et al. | 707/104.1 |

FOREIGN PATENT DOCUMENTS

JP          8-18923 A          1/1996

* cited by examiner

*Primary Examiner*—Thai Tran
*Assistant Examiner*—Christopher Findley
(74) *Attorney, Agent, or Firm*—Birch, Stewart, Kolasch & Birch, LLP

(57) ABSTRACT

The digital camera photographs a moving image to record moving image data in an internal or an external memory. Plural frame images as index images are extracted from the moving image. A display area in an LCD is divided into plural index frames for displaying the index images. The number of the index frames is determined in accordance with the number of the index images, so that all of the index images are displayed at the same time. The moving image is reproduced from the scene corresponding to the selected index image.

11 Claims, 6 Drawing Sheets

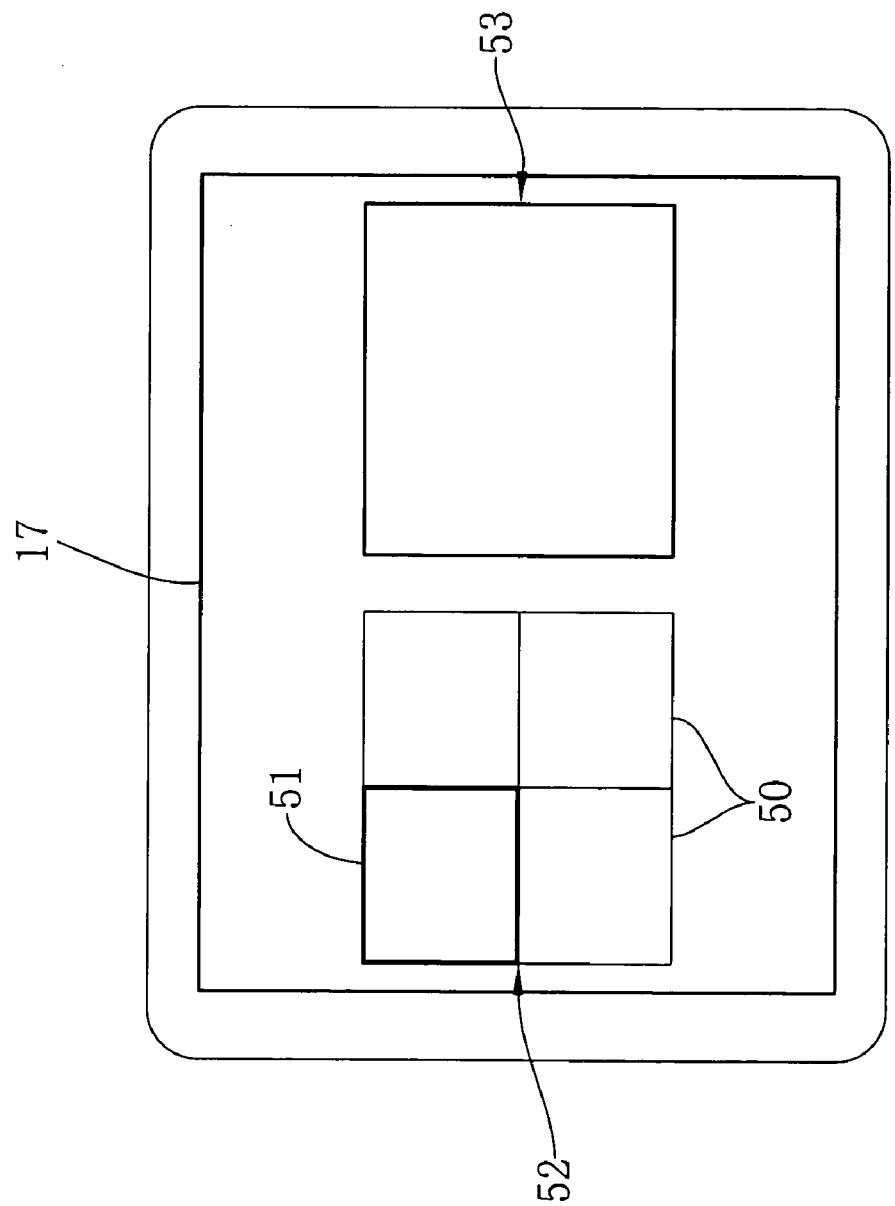

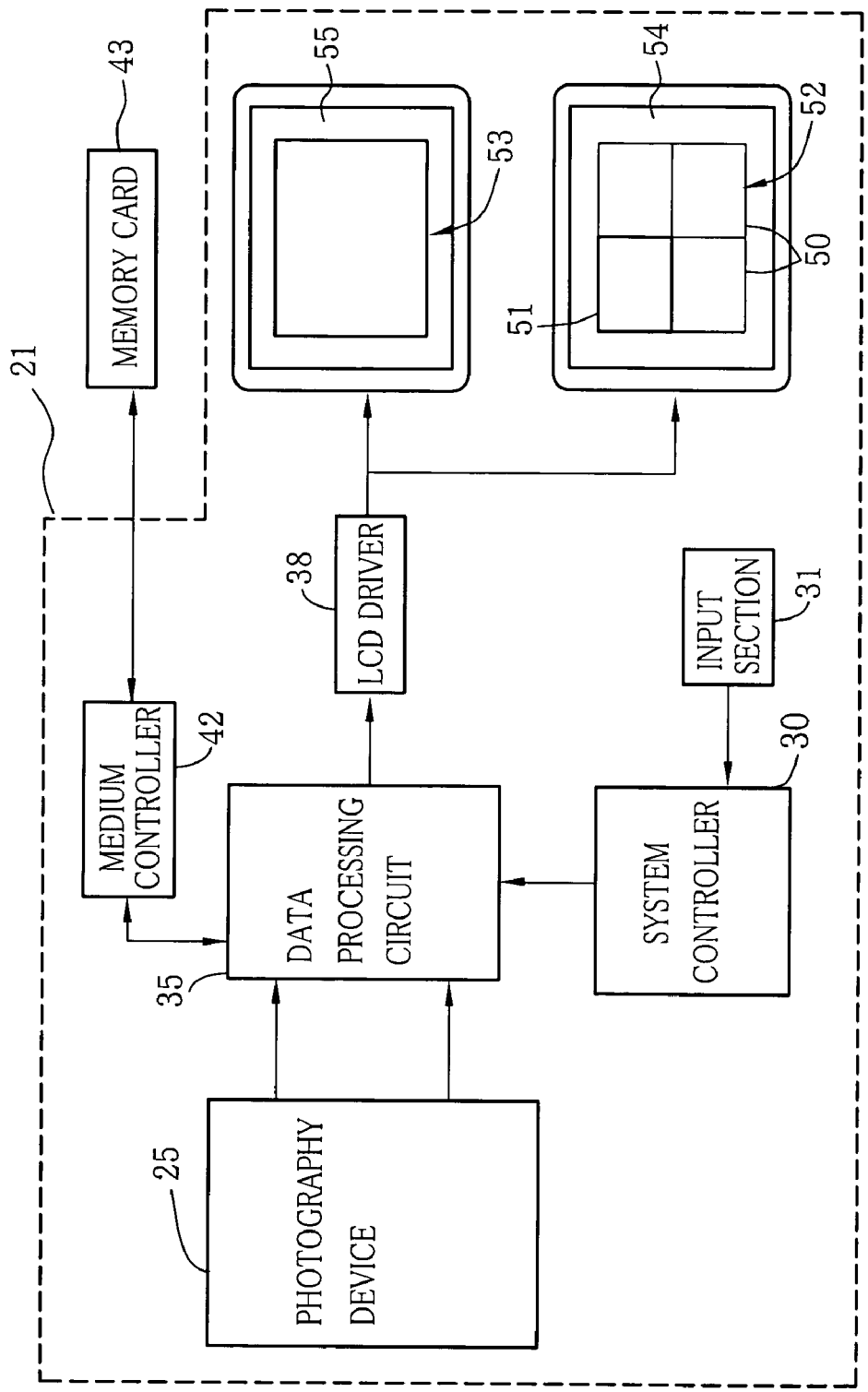

MOVING IMAGE REPRODUCTION APPARATUS AND METHOD

This nonprovisional application claims priority under 35 U.S.C. § 119(a) on Patent Application Nos. 2002-304755 and 2002-332418 filed in JAPAN on Oct. 18, 2002 and Nov. 15, 2002, which are herein incorporated by reference.

BACKGROUND OF THE INVENTION

1. Field of the Invention

The present invention relates to reproduction of a moving image having a plurality of frame images.

2. Description Related to the Prior Art

A digital camera is well known as a photography device in which a CCD image sensor converts optical subject image into digital still or moving image data. Subject image data is stored in an internal memory or external recording device such as a memory card. Still or moving image taken by the digital camera is reproduced and displayed on a display device such as an LCD.

In order to find a desired scene in the recorded moving image, an ordinary user had to view the moving image from the beginning. Such an operation is troublesome and time consuming, hence the image reproduction device described in Japanese Patent Laid-Open Publication (JP-A) No. 08-018923 obtains index images by extracting plural images from a moving image, and displays the index images in a monitor that is divided into nine display frames, for instance. Then, the image reproduction device starts displaying the moving image from the scene corresponding to the selected index image.

The image reproduction device described in the above publication extracts the index images at fixed time intervals. In the event that the number of extracted index images is more than nine, it is not possible to display all of the index images at a same time. Then, the user has to use a scroll operation to display additional index images to recognize the outline of the whole moving image. Such scroll operation is troublesome for the user and causes longer time to find the desired scene to be reproduced.

SUMMARY OF THE INVENTION

An object of the present invention is to provide an apparatus and a method that a user can easily recognize the outline of whole moving image.

Another object of the present invention is to provide an apparatus and a method that can shorten the time to find a desired scene to start reproduction of the moving image.

To achieve the above objects, the moving image reproducing apparatus according to the present invention comprises a first display device for display index images, extracted from the moving image at regular intervals, in a divided display area. The number to divide the display area changes in accordance with the number of the index images. The moving image is reproduced from the scene corresponding to a selected index image.

In the preferred embodiment, the first display device displays all index images at the same time. The interval to extract the frame images is changed in accordance with the number of the index images.

The first display device may display the index images and the moving image at the same time. It is also possible to provide a second display device to display the moving image.

The moving image reproduction apparatus may have a photography device to take a subject image continuously to obtain the moving image.

According to the present invention, since a display area is divided in accordance with the number of the extracted index images, a user can easily recognize the outline of whole moving image. In addition, since the moving image and the index images are displayed at the same time, it is possible to shorten the time to find a desired scene to start reproduction of the moving image.

BRIEF DESCRIPTION OF THE DRAWINGS

The above objects and advantages of the present invention will become easily understood by one of ordinary skill in the art when the following detailed description would be read in connection with the accompanying drawings.

FIG. 6 is a plan view of the LCD in which a moving image and index images are displayed at the same time; and FIG. 7 is a block diagram of another embodiment of the digital camera with two display devices.

PREFERRED EMBODIMENTS OF THE INVENTION

Figure 1:
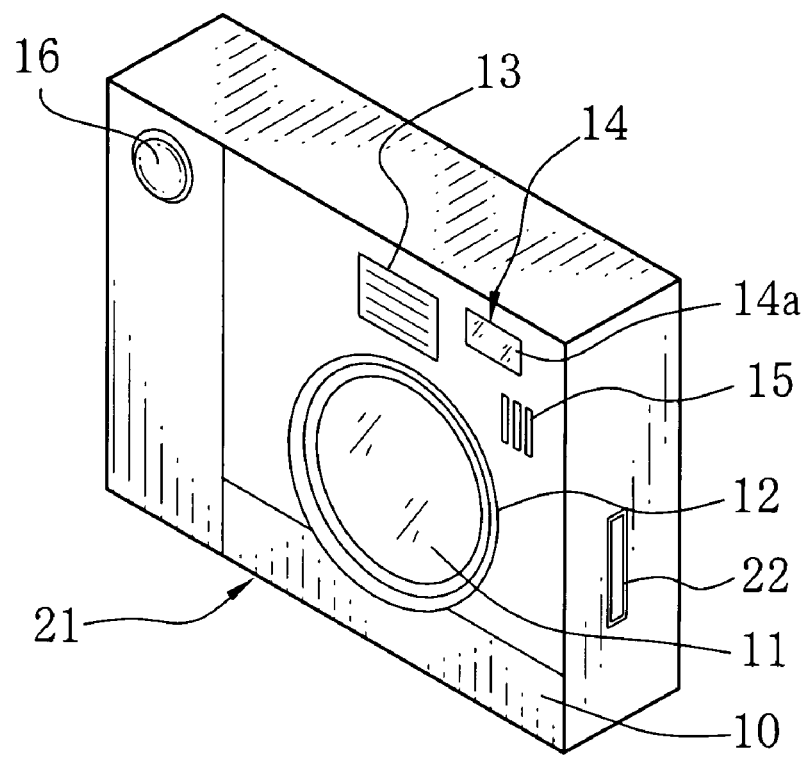
FIG. 1 is a front perspective view of a digital camera.
Figure 2:
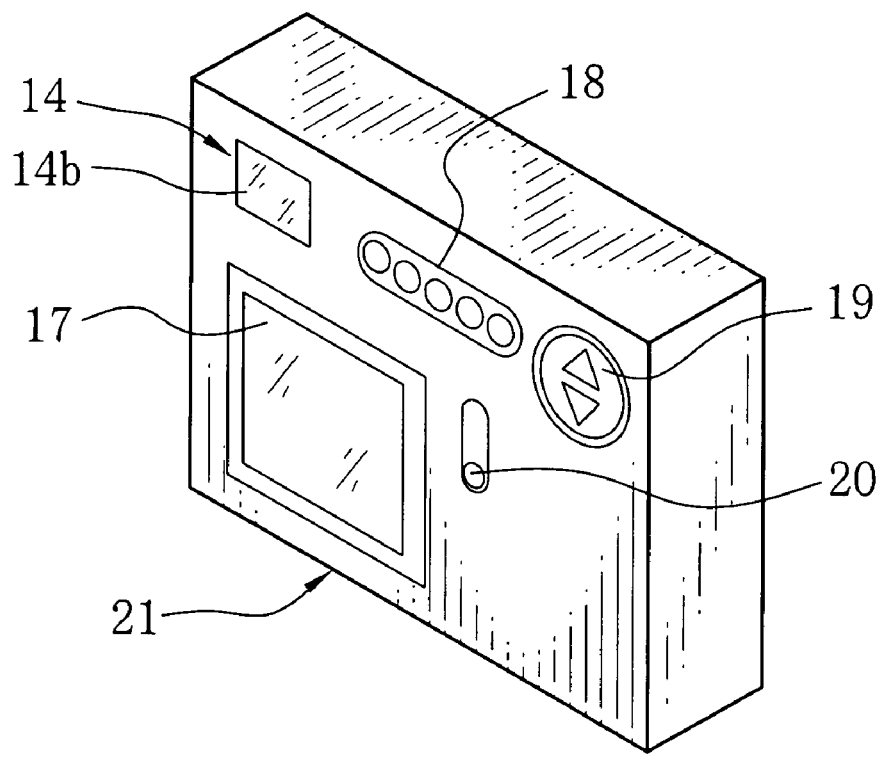
FIG. 2 is a rear perspective view of the digital camera.

In FIGS. 1 and 2, a digital camera 21 has a lens barrel 12 to hold a taking lens 11, a flash emission window 13, an objective side viewfinder window 14a of an optical viewfinder 14 and a shutter release button 16 in a front surface. An eyepiece side viewfinder window 14b, liquid crystal display (LCD) 17, an operation panel 18, a zoom button 19 and mode selection switch 20 are provided in the rear surface of the digital camera 21. A memory slot for inserting a memory card 43 (see FIG. 3) is formed in a lateral surface of the digital camera 21. The memory slot is covered with a lid member 22.

The operation panel 18 has plural operation buttons to turn the power on and off, switch the operation mode between a taking mode and a reproduction mode, select or delete an image in the reproduction mode, and so forth. When the digital camera 21 is switched on, a lens barrel 12 protrudes forward from an initial position to a photography position. The taking lens 11 is a zoom lens movable between a telephoto side and a wide-angle side, so that an optical subject image is magnified by operating the zoom button 19.

The mode selection switch 20 is slidable to select a still image photography mode or a moving image photography mode in the taking mode. When the shutter release button 16 is pressed in the still image photography mode, a CCD image sensor 32 (see FIG. 3) is driven to photograph a subject image of one frame to obtain digital image data.

Upon operation of the shutter release button 16 in the moving image photography mode, the CCD image sensor 32 is driven to start photograph the subject continuously to record a moving image. Image data of each frame is obtained at a predetermined time interval (1/30 sec, for instance). The digital camera 21 stops photographing the subject when the shutter release button 16 is pressed again. After data processing, image data of the moving image (moving image data) is stored in the memory card 43.

In recording the moving image, a microphone 39 (see FIG. 3) provided behind plural slits 15 in the front surface of the digital camera 21 records external sound and outputs sound data. Sound data is associated with image data of corresponding frame, and stored in the memory card 43.

The optical viewfinder 14 is used for framing the subject. The view area by the optical viewfinder 14 changes in accordance with the zooming operation of the taking lens 11. The LCD 17 is used as an electrical viewfinder to display subject image in a real-time manner in the taking mode, and displays a still image or a moving image in the reproduction mode.

Figure 3:
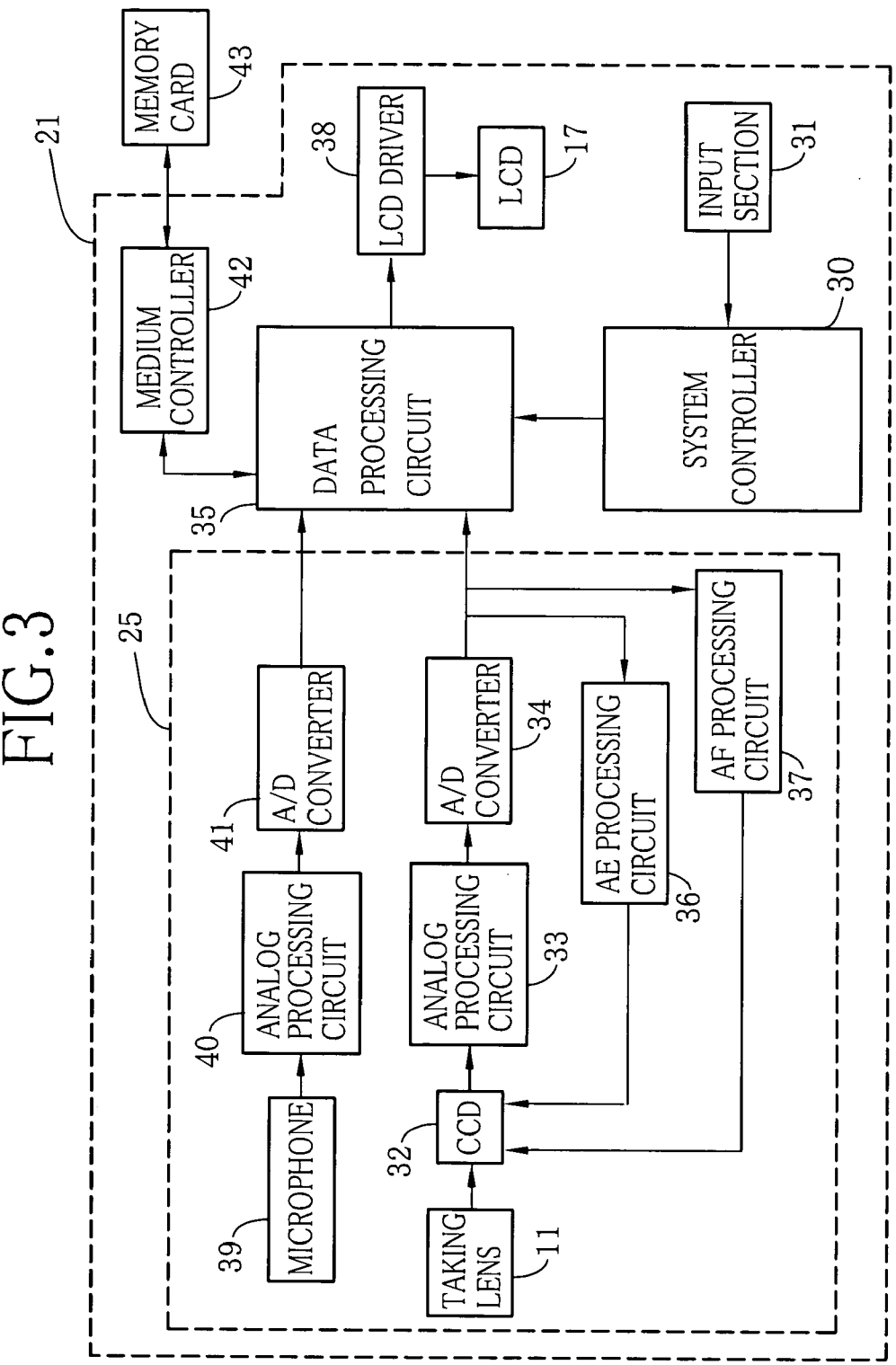
FIG. 3 is a block diagram of electrical structure of the digital camera.

Referring to FIG. 3, a system controller 3 controls the operation of the electrical components of the digital camera 21. In response to the operation of the shutter release button 16, the operation panel 19 and the mode selection switch 20, an input section 31 sends corresponding operation signals to the system controller 30. The system controller 30 controls the components in accordance with the operation signals, so that the sequences for photographing the subject are carried out.

Image data and sound data are produced in a photography device 25, and send to a data processing circuit 35. In the photography device 25, the CCD image sensor 32 behind the taking lens 11 converts an optical subject image into electrical image signals. The image signals from the CCD image sensor 32 is subject to gain control and gamma conversion processes in an analog processing circuit 33. Processed image signals are sent to an A/D converter 34 to convert the image signals into image data of red (R), green (G) and blue (B). It is possible to convert RGB components of image data into luminance and chromatic (Y, Cr, Cb) component. Image data is forwarded from the A/D converter 34 to the data processing circuit 35, an AE (auto exposure) control circuit 36 and an AF (auto focus) control circuit 37.

The data processing circuit 35 carries out gamma correction, resolution conversion, data compression/extension processes to image data. In the taking mode, processed image data is sent to an LCD driver 38 for displaying the subject image continuously in the LCD 17.

The AE control circuit 36 adjusts an exposure amount by controlling the shutter speed and the aperture value of the digital camera 21 in accordance with brightness of the subject image. Based on image data from the A/D converter 34, the AF control circuit 37 detects if the optical subject image is properly focused. If the optical subject image is not focused, the AF control circuit 37 actuates a focusing lens (not shown) in the taking lens 11 to focus the optical subject image onto the CCD image sensor 32.

In the moving image photography mode, the microphone 39 converts external sound into sound signals. An analog processing circuit 40 amplifies the sound signals at an automatically adjusted amplification rate. Amplified sound signals are sent to an A/D converter 41 to obtain digital sound data. The A/D converter 41 outputs digital sound data to the data processing circuit 35 to perform data processing such as data compression.

A media controller 42 controls data exchange between the memory card 43 and the data processing circuit 35 of the digital camera 21. After data processing, image data of single frame, moving image data and/or sound data is stored in the memory card 43 through the media controller 42.

The digital camera 21 has digest function to display index images sequentially in the LCD 17 in the reproduction mode, so that the user can recognize an outline of the moving image. The index images are extracted from the moving image at predetermined intervals, every 150 frames (every 5 seconds) for instance. The digital camera 21 starts reproduction of the moving image from the scene corresponding to the selected index image. The digest function is activated when the moving image data is read from the memory card 43 in the reproduction mode. It is also possible to activate the digest function by external operation via the operation panel 18.

Figure 4B:
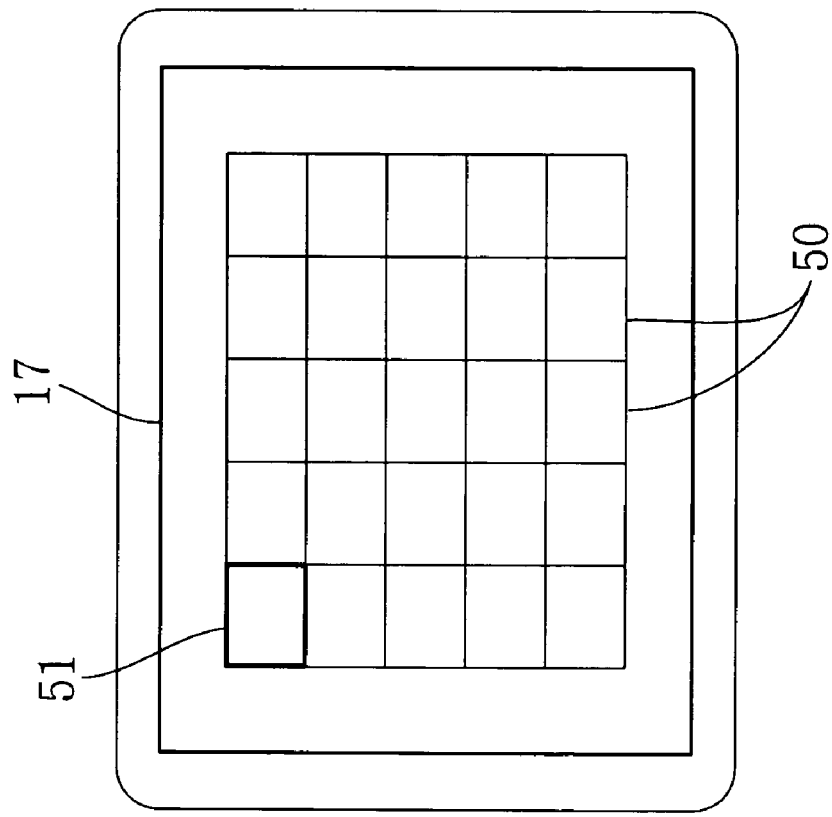
FIG. 4B is a plan view of the LCD in which twenty-five index images are concurrently displayed.
Figure 4A:
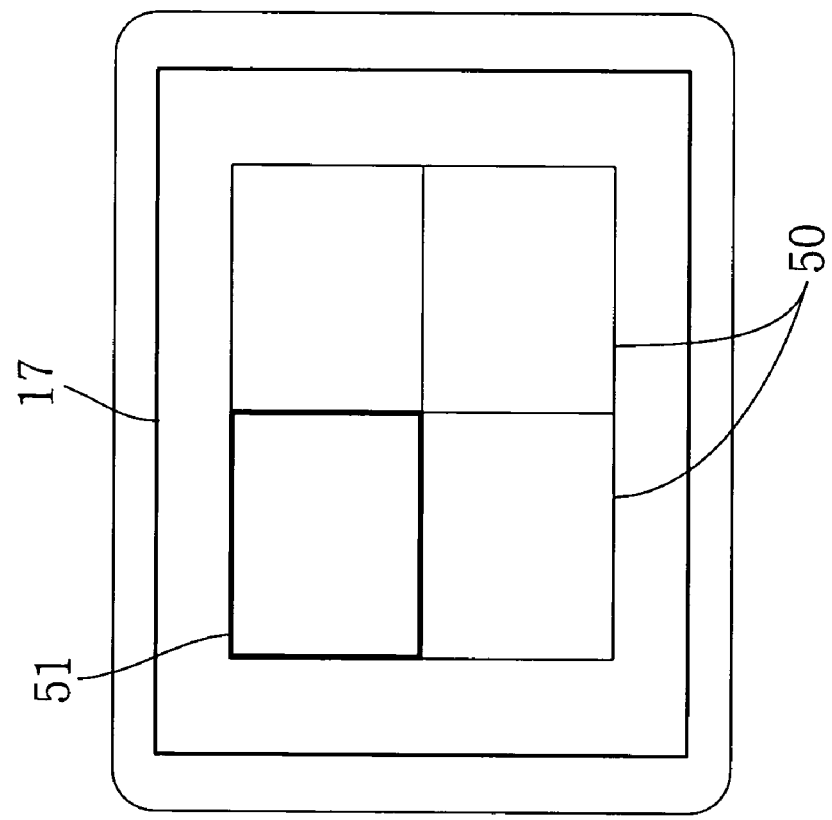
FIG. 4A is a plan view of an LCD in which four index images are concurrently displayed.

When the digest function is activated, the LCD 17 displays extracted index images 50 in divided index frames, as shown in FIGS. 4A and 4B. The LCD 17 can display four (two by two) index images 50 at minimum, and twenty-five (five by five) index images 50 at maximum. The number of the divided index frames is determined in accordance with the number of the extracted index images. For instance, if the moving image has frame images for 20 sec, four index images (20 sec divided by 5 sec/index) are extracted and sequentially displayed in divided index frames of the LCD 17, as shown in FIG. 4A. On the other hand, if the recorded time of the moving image is 2 min, twenty-four index frames (120 sec divided by 5 sec/index) are displayed in divided index frames. Each of the index images is displayed with a sequentially assigned reference number.

When the digest function is activated, a rectangular cursor 51, shown by a thick box, is displayed in the LCD 17. The cursor 51 is movable vertically and horizontally by external operation of the operation panel 18, so that the user can select the desired index image. After selection, the moving image is reproduced from the scene corresponding to the selected index image. If the number of the index images is twenty-six or more, the interval to extract the index image is elongated (every 300 frames (10 sec) for instance) so as to keep the number of the extracted index image twenty-five or less.

The operation of the above digital camera will be described. In taking a moving image, the operation panel 18 is operated to power the digital camera 2. Then, the moving image photography mode is selected by operating the mode switch 20. After framing the subject image by use of the optical viewfinder 14 or the LCD 17, the user presses the shutter release button 16 to start photography of the moving image.

The CCD image sensor 32 is driven to take the subject image at every 1/30 second to sequentially obtain image data of each frame. At the same time, the microphone 39 is driven for recording sound to produce sound data. Moving image data and sound data are stored in a buffer memory of the data processing circuit 35. When the shutter release button 16 is pressed to stop photography of the moving image, moving image data and sound data in the buffer memory are compressed and output to the memory card 43 via the media controller 42.

Figure 5:
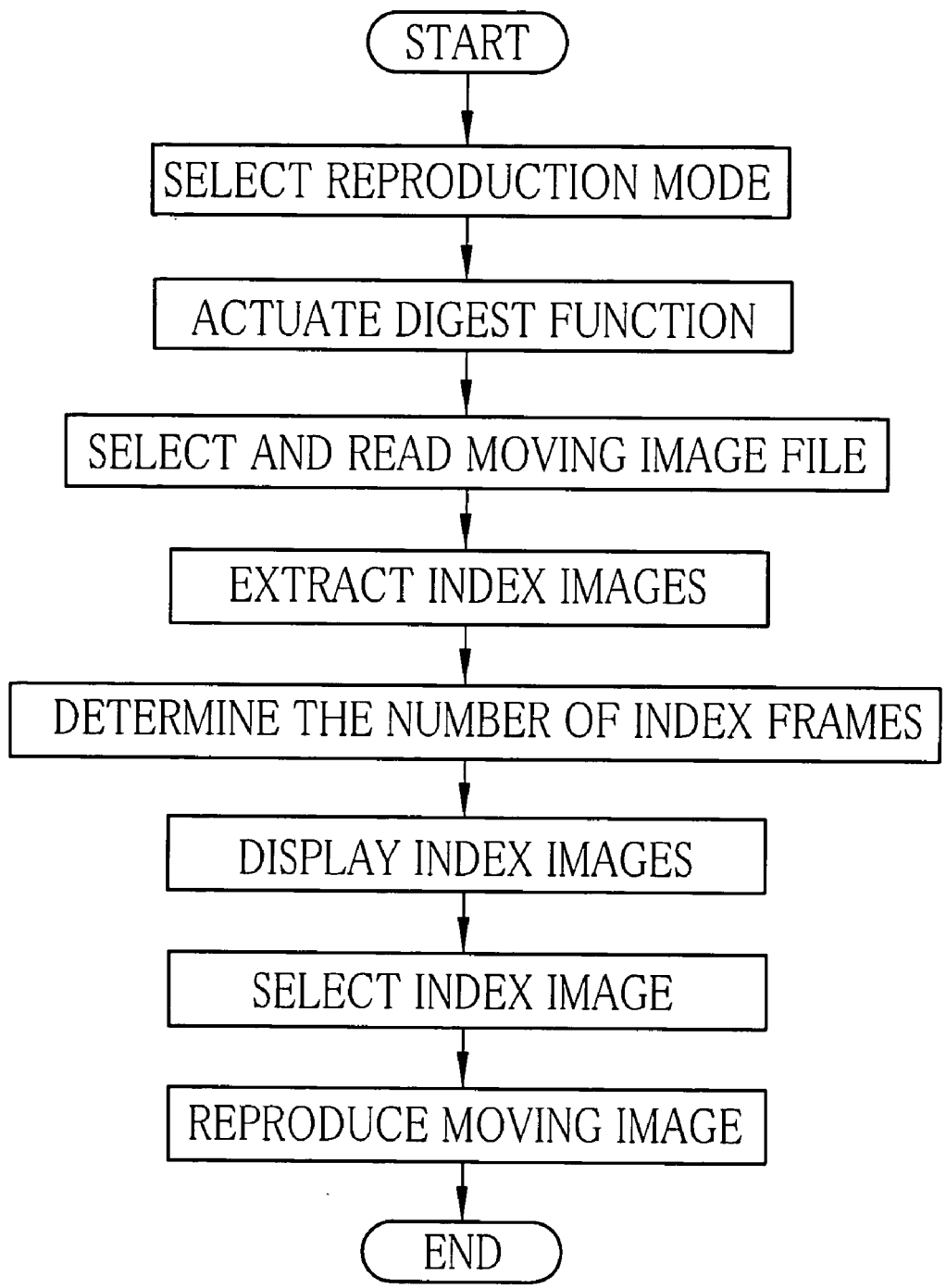
FIG. 5 is a flow chart of a digest display function.

In reproducing the recorded moving image, the user operates the operation panel 18 to activate the digest function in the reproduction mode. Following the flow chart shown in FIG. 5, moving image data of a selected moving image is sent to the data processing circuit 35 from the memory card 43. In the data processing circuit 35, plural index images are extracted from the moving image. The system controller 30 controls the LCD driver 38 to divide the display area in the LCD 17 to form plural index frames. The number of the index frame is determined in accordance with the number of the extracted index images. Image data of the index images is sequentially forwarded to the LCD driver 38 to display the index images in the divided index frames in the LCD 17.

By viewing the index images 50 displayed in the LCD 17, the user can recognize the outline of the selected moving image without scrolling the displayed images. When one designated index image is selected, the moving image is reproduced from the scene corresponding to the selected index image 50.

Although only the index images are displayed in the above embodiment, it is possible to display the index images 50 and the moving image at the same time. For instance, the display area in the LCD 17 may be divided into an index frame area 52 for displaying index images and a reproduction frame area 53 for displaying the moving image, as shown in FIG. 6. Moreover, as shown in FIG. 7, the digital camera 21 may have an index display LCD 54 for the index frame area 52 and a reproduction LCD 55 for the reproduction frame area 53. Thereby, the user can view the moving image while selecting the index image, so it is possible to shorten the search time for finding the desired scene in the moving image. The proportion of the index frame area 52 and the reproduction frame area 53 may be determined in accordance with the number of the index images, so that each of the index images in the index frame area 52 does not become too small to recognize.

Although a digital camera is used to describe the above embodiment, it is possible to apply the present invention to other type of moving image reproduction devices, such as a DVD player and an HDD player.

Various changes and modifications are possible in the present invention and may be understood to be within the scope of the present invention.

What is claimed is:

1. A digital camera for reproducing a moving image of a predetermined length having a plurality of frame images, the digital camera comprising:
    a moving image processing device that extracts individual frame images as index images from the moving image at a regular interval;
    a first display device that displays the index images in a divided display area, the first display device changing a number by which to divide the display area in accordance with a total number of the index images extracted from the moving image of a predetermined length,
    wherein if said total number of index images extracted from the moving image of a predetermined length exceeds a maximum, said regular interval is elongated such that said total number of index images extracted from the moving image of a predetermined length is equal to or less than said maximum; and
    a controller that starts reproduction of the moving image from the scene corresponding to a selected index image.

2. A digital camera according to claim 1, wherein the, first display device displays all index images at the same time.

3. A digital camera according to claim 1, wherein the first display device displays the index images and the moving image at the same time.

4. A digital camera according to claim 1, further comprising a second display device that displays the moving image.

5. A digital camera according to claim 1, further comprising a photography device that captures a subject image continuously to obtain the moving image.

6. A digital camera according to claim 1 wherein said total number of index images extracted from the moving image of a predetermined length is not less than a minimum.

7. A method, used in a digital camera, for reproducing a moving image of a predetermined length with a plurality, of frame images, the method comprising the steps of:
    extracting individual frame images as index images from the moving image at a regular interval;
    displaying the index images in a divided display area of a first display device, the first display device changing a number by which to divide the display area in accordance with a total number of the index images extracted from the moving image of a predetermined length,
    wherein if said total number of index images extracted from the moving image of a predetermined length exceeds a maximum, said regular interval is elongated such that said total number of index images extracted from the moving image of a predetermined length is equal to or less than said maximum; and
    starting reproduction of the moving image from the scene corresponding to a selected index image.

8. A method according to claim 7, wherein the first display device displays all index images at the same time.

9. A method according to claim 7, wherein the first display device displays the index images and the moving image at the same time.

10. A method according to claim 7, wherein the moving image is reproduced in a second display device.

11. A method according to claim 7 wherein said total number of index images extracted from the moving image of a predetermined length is not less than a minimum.

* * * * *